United States Patent
Hariharan et al.

(10) Patent No.: US 8,229,362 B2
(45) Date of Patent: Jul. 24, 2012

(54) TECHNIQUES FOR REDUCING NOISE AND INTERFERENCE IN WIRELESS COMMUNICATION SYSTEMS

(75) Inventors: Raghunath Hariharan, Streamwood, IL (US); Robert V. Stephens, Bartlett, IL (US)

(73) Assignee: Motorola Mobility, Inc., Libertyville, IL (US)

(*) Notice: Subject to any disclaimer, the term of this patent is extended or adjusted under 35 U.S.C. 154(b) by 317 days.

(21) Appl. No.: 12/467,473

(22) Filed: May 18, 2009

(65) Prior Publication Data

US 2010/0291876 A1    Nov. 18, 2010

(51) Int. Cl.
*H04B 1/00*    (2006.01)
(52) U.S. Cl. .................................................. 455/63.1
(58) Field of Classification Search ............. None
See application file for complete search history.

(56) References Cited

U.S. PATENT DOCUMENTS

2009/0135748 A1*    5/2009    Lindoff et al. ............... 370/296
* cited by examiner

*Primary Examiner* — Lincoln Donovan
*Assistant Examiner* — Sibin Chen

(57) ABSTRACT

A technique for decreasing noise and interference in an uplink of a wireless communication system includes detecting, at a serving base station, noise and interference levels above a threshold. In response to the detecting, a noise and interference measurement frame is scheduled that includes respective allocated portions for respective active subscriber stations and respective unallocated portions that are adjacent to the respective allocated portions and are not allocated to one of the respective active subscriber stations. The respective allocated portions and the respective unallocated portions are configured in a selected pattern in the noise and interference measurement frame. The respective noise and interference levels are determined, at the serving base station, in the respective unallocated portions of the noise and interference measurement frame. One or more rogue subscriber stations, included in the respective active subscriber stations, are then identified based on the respective noise and interference levels associated with the respective active subscriber stations. When it is ambiguous as to whether a subscriber station is a rogue subscriber station, additional noise and interference measurement frames may be scheduled to resolve the ambiguity.

20 Claims, 4 Drawing Sheets

TECHNIQUES FOR REDUCING NOISE AND INTERFERENCE IN WIRELESS COMMUNICATION SYSTEMS

BACKGROUND

1. Field

This disclosure relates generally to wireless communication systems and, more specifically, to techniques for reducing noise and interference in wireless communication systems.

2. Related Art

Today, many wireless communication systems are designed using a shared uplink (UL) channel. For example, in the Institute of Electrical and Electronics Engineers (IEEE) 802.16 (commonly known as worldwide interoperability for microwave access (WiMAX)) and third-generation partnership project long-term evolution (3GPP-LTE) compliant architectures, a UL channel is shared and resources are periodically allocated to subscriber stations (SSs) by a serving base station (BS).

In a typical WiMAX compliant wireless communication system, when a user of an SS activates the SS, the SS searches for a downlink signal from a BS and attempts to coordinate with the BS when the downlink signal is found. If a recent downlink channel existed for the SS, the SS may attempt to reuse functional parameters associated with the recent downlink channel. When a recent downlink channel does not exist for an SS, the SS may examine various potential downlink channels in a downlink frequency band. When a downlink channel is selected, the SS attempts to synchronize with a transmission on the channel, e.g., by detecting cyclic frame preambles.

After time synchronization (between a BS and an SS) has been established at a physical (PHY) layer of the SS, the SS may continue to search for downlink channel descriptor (DCD) and uplink channel descriptor (UCD) messages that are periodically broadcast by the BS. The DCD and UCD messages include information about physical layer features of both the downlink and uplink channels. Among other information, the messages provide (to the SS) a modulation type and forward error correction (FEC) type employed by the BS. Depending on the physical specification selected for a given setting, the BS may periodically transmit uplink-map (UL-MAP) and downlink-map (DL-MAP) messages that describe burst start times for the channels. In a WiMAX compliant communication system, the BS also assigns SSs to the downlink and uplink channels through the DL-MAP and UL-MAP messages.

A WiMAX compliant SS transmits code division multiple access (CDMA) codes (to a BS) to achieve synchronization and receive an allocation from the BS. By the time an SS receives an assignment/allocation from a BS, it can be assumed that the SS has achieved synchronization (in both time and frequency) with the BS. After contention based ranging, an SS receives an uplink grant to send in a bandwidth request header to allow a BS to assign additional uplink grants to the SS. In the case of initial ranging, the BS provides an unsolicited allocation which the SS uses to send a WiMAX packet ranging request. The ranging process is part of framing and media access in IEEE 802.16 and includes initial ranging and periodic ranging. The early ranging contention slot is used for network entry (NE), In initial ranging, an SS sends a ranging request (RNG-REQ) message in a primary ranging contention slot. If the message is received correctly by the BS, the BS replies to the SS with a ranging response (RNG-RSP) message that provides timing and power correction information to the SS. The information in the ranging response message permits the SS to adjust timing and power of a signal that is to be transmitted (from the SS) to the BS.

In a typical implementation, the ranging response message also provides a connection ID (CID) assigned (by the BS) to the SS. In contrast to an initial ranging message, a periodic ranging message may be employed by an SS to send ranging-request messages to the BS in order to adjust power levels, time, and frequency offsets. After ranging is complete, the SS reports its physical layer capabilities (e.g. available modulation and coding schemes, whether frequency division duplexing (FDD) supports half-duplex or full-duplex, and/or whether time division duplexing (TDD) supports half-duplex or full-duplex) to the BS, which may accept or reject the reported capabilities. After reporting its capabilities, an SS may be authenticated and authorized by the BS. Typically, each SS is assigned a digital certificate, which is physically bound to hardware of the SS during manufacturing. Usually, a certificate of an SS includes a medium access control (MAC) address, e.g., a 48-bit MAC address, that a BS utilizes to authenticate the SS.

After authentication and authorization, the SS continues with the registration stage. In the registration stage, an SS sends a registration request message to the BS. The BS may respond with a registration response message that includes a secondary management CID for the SS and an Internet protocol (IP) version used for the secondary management CID. The receipt of the registration response message (from the BS) indicates to the SS that the SS has been registered in the network and is allowed to enter the network. Following registration, the SS can obtain an IP address through a dynamic host configuration protocol (DHCP), obtain current time information (e.g., through the Internet time protocol), as well as obtain other parameters from the BS.

A wireless communication system may implement an element management system (EMS) to manage elements and dynamically measure and optimize network performance. A typical EMS provides service and network management. For example, an EMS may be configured to provide a unified interface to manage and control elements (e.g., BSs, SSs, and gateways) of a radio access network (RAN) and quality-of-service (QoS) management for multi-application use. An EMS may also be configured to provide real-time performance monitoring (for radio network optimization) and configuration, alert, and alarm management. An SS may be configured to employ an over-the-air (OTA) option that facilitates channel power monitor measurement. In general, the OTA option allows power of a specific channel to be measured and analyzed by an SS. The OTA option may be utilized with a global positioning system (GPS) feature such that measurement data, which can include GPS location and time data for plotting on a map, may be reported for utilization in network management.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
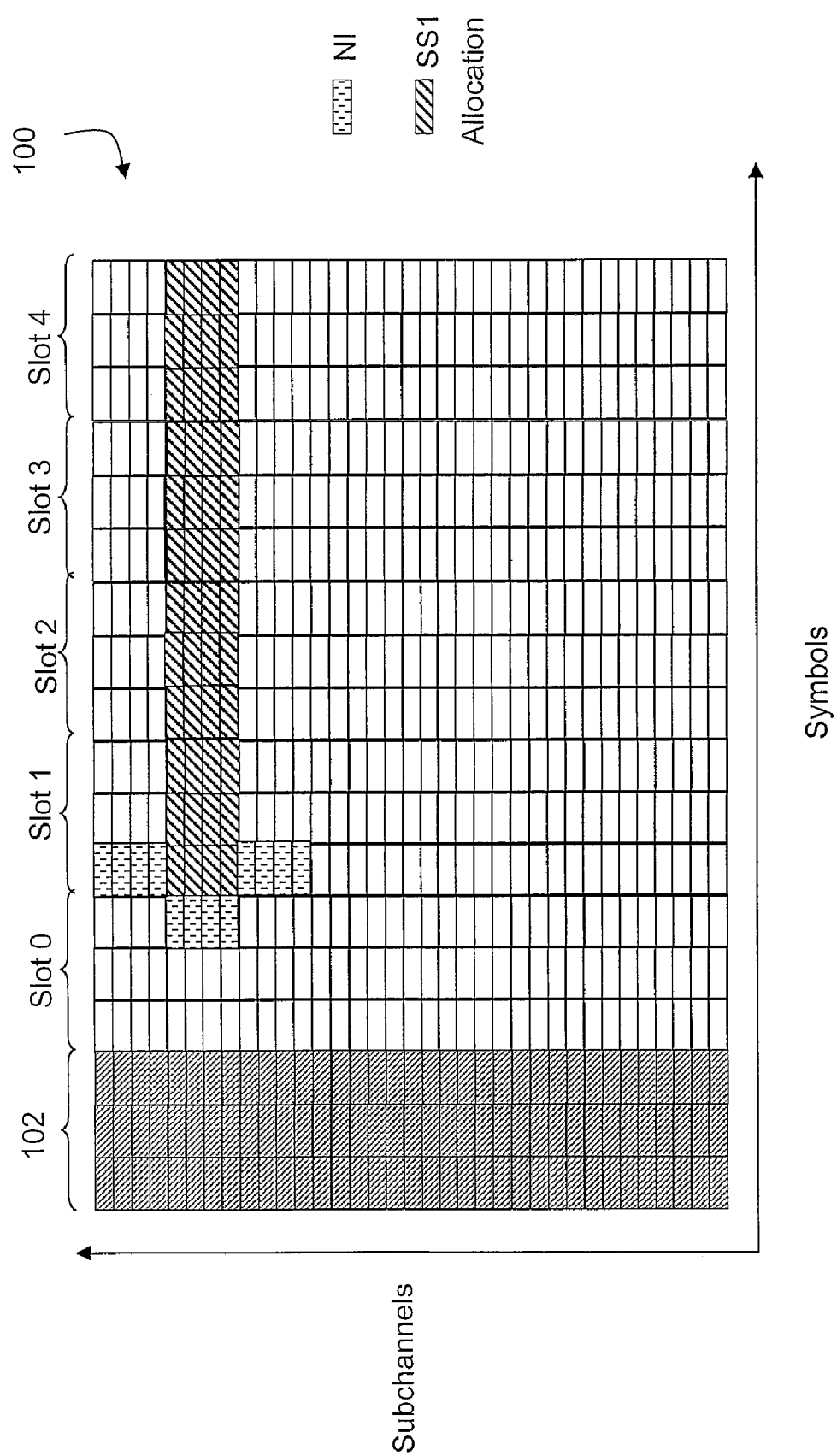
FIG. 1 is an example diagram of a relevant portion of an uplink (UL) subframe of a wireless communication system that depicts a subscriber station (SS) transmitting outside of allocated time-slots (slots) and an allocated bandwidth.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents.

While the discussion herein is generally directed to a WiMAX compliant wireless communication system, it should be appreciated that the techniques disclosed herein are broadly applicable to wireless communication systems that may experience noise and interference in a shared uplink (UL) subframe. As used herein, the term "coupled" includes both a direct electrical connection between blocks or components and an indirect electrical connection between blocks or components achieved using one or more intervening blocks or components.

In a wireless communication system, a subscriber station (SS), such as a mobile station (MS), may transmit outside of an allocated bandwidth and time-slot for a variety of reasons. For example, an SS may transmit outside of assigned orthogonal frequency division multiple access (OFDMA) time-slots (slots) and subchannels allocated (by a scheduler) to the SS because the SS is not time and frequency synchronized with a serving base station (BS). When an SS transmits outside of allocated slots and subchannels, noise and interference (NI) may be increased in an uplink (UL) subframe. In this case, other SSs may have to transmit at a higher power (see, for example, the IEEE 802.16e specification) to account for the increase in NI. For example, an outer loop power control (OLPC) uplink burst transmit power equation for a WiMAX compliant SS is as follows:

$$PEIRP(dBm)=PL+CNR+R+(N+I)+10 \log 10(BWsch)+Offset\_SSperSS+Offset\_BSperSS$$

where 'PEIRP' is the transmitted effective isotropic radiated power (EIRP) expressed in decibels of measured power referenced to one milliwatt (dBm) per subcarrier for a current transmission (includes an SS transmit antenna gain and related coupling losses), 'PL' is the estimated average current UL path loss, 'CNR' is the normalized carrier-to-noise ratio (per subcarrier) for a given modulation, 'R' is the number of repetitive sequences used by the employed receiving circuitry to determine the path loss, 'BWsch' is the bandwidth occupied by an OFDM subcarrier (expressed in Hz), 'N+I' is the estimated normalized average power level of the noise and interference (in dBm) per subcarrier at a receive antenna port of a receiving side BS, for a bandwidth of 1 Hz, 'Offset_SSperSS' is the correction term for SS specific power offset, and 'Offset_BSperSS' is the SS specific power offset controlled by the BS through power control messages.

In general, conventional approaches that address NI have not identified and isolated a rogue SS (i.e., an SS that is causing an excess amount of NI in slots before and/or after one or more assigned slots) on a given sector for a particular site. According to various aspects of the present disclosure, techniques for correlating high NI with one or more SSs is disclosed. Broadly, the disclosed techniques employ NI detection using one or more NI measurement frames that employ a UL pattern that facilitates identification of slots allocated to specific SSs and measurements of signal strength in slots that are adjacent to the allocated slots and are not assigned to any of the SSs. An NI report may then be provided (e.g., to a scheduler) such that rogue SSs may be isolated. Upon detection of NI values being above a specified threshold in one or more unallocated slots of a UL subframe (in which an SS may transmit data), a scheduler may be employed to build an NI measurement frame to determine which active SS or SSs are causing the NI.

For example, each SS may be assigned a one slot UL allocation and each one slot UL allocation may be surrounded by two or more unallocated (blank) slots in each NI measurement frame. As used herein, a slot includes one or more subcarriers and one or more symbols. UL SS signal power may then be measured in the allocated slots and NI may be measured in the unallocated (blank or open) slots that are adjacent to the allocated slots. When it is ambiguous as to which of multiple active SSs is causing a particular NI problem, an iterative technique may be employed to correlate high NI from a blank slot to an adjacent single slot allocation for a given SS or to prove that none of the SSs is causing a particular NI problem. In this manner, an SS may be correctly identified as a rogue SS when the NI is relatively high. For example, when it is ambiguous as to which of two SSs is causing a NI problem, separation (in frequency and/or time) between the two SSs may be increased in a new NI measurement frame in an attempt to determine if one or both of the two SSs are rogue SSs.

As one example, a technique for determining rogue SSs may include detecting high NI through normal operation using normally scheduled NI measurements (of NI in unallocated slots of a UL subframe). In the event that a high NI level (e.g., an NI level of 10 dBm or higher) is detected, a scheduler may be employed to build one or more NI measurement frames using UL patterns designed to isolate the source of the NI. Based on NI measurements made in an NI measurement frame, the scheduler may also be employed to build a candidate list of rogue SSs. When it is ambiguous as to which SSs are causing a NI problem, the scheduler may iterate through the candidate list of rogue SSs and build one or more new NI detection frames by providing slot and subchannel allocations to potential rogue SSs that are separated by a greater amount (in frequency and/or time). When the rogue SSs are identified, a blacklist of the rogue SSs can be used to deregister SSs confirmed as rogue SSs. Defective SSs (indicated by the blacklist) may also be reported to an element management system (EMS). SS MAC addresses associated with the rogue SSs may also be used to filter ranging request (RNG-REQ) messages to prevent network entry (NE) completion for the rogue SSs.

Using the techniques described herein, NI problems may be categorized as being caused by: an SS on the system; an SS on a co-channel system; or an extraneous device (for example, implemented to launch a denial-of-service attack on the system). In a co-channel system that is NI limited, the disclosed techniques may be employed to facilitate collaborative scheduling between the co-channel systems. The disclosed techniques may be employed to layout co-channel systems to reduce NI and/or may be employed to optimize a layout of existing co-channel systems. It should be appreciated that the techniques disclosed herein are not directed to detecting an NI problem in a ranging region or preventing a rogue SS from continuously ranging. However, the techniques disclosed herein may be employed to isolate a MAC address of a rogue SS to prevent the rogue SS from corrupting an entire sector of a site. In general, the disclosed techniques enable network operators to: improve quality of service (QoS) of sites; provide key operation and maintenance (O&M) features which allow customers to create mobile specific interference checks in real-time on their networks using existing WiMAX measurement metrics; and automate policing of emission quality on a large number of SSs on a network independent of device manufacturer. Moreover, the disclosed techniques establish a co-channel interference framework for mitigating co-channel interference in high reuse site configurations (e.g., 1×4×1, 1×4×2, 1×3×1), through the combination of scheduler allocation patterns and NI measurements. The disclosed techniques also provide a co-channel interference metric which may be used for cooperative scheduling between co-channel sectors.

According to one aspect of the present disclosure, a technique for decreasing noise and interference in an uplink of a wireless communication system includes detecting, at a serving base station, noise and interference levels (e.g., power levels) above a threshold. In response to the detecting, a noise and interference measurement frame is scheduled that includes respective allocated portions for respective active subscriber stations and respective unallocated portions that are adjacent to the respective allocated portions and are not allocated to one of the respective active subscriber stations. The respective allocated portions and the respective unallocated portions are configured in a selected pattern in the noise and interference measurement frame. The respective noise and interference levels (e.g., power levels) are determined, at the serving base station, in the respective unallocated portions of the noise and interference measurement frame. One or more rogue subscriber stations, included in the respective active subscriber stations, are then identified based on the respective noise and interference levels associated with the respective active subscriber stations.

According to another aspect of the present disclosure, a technique for decreasing noise and interference in an uplink of a wireless communication system includes scheduling a first noise and interference measurement frame that includes respective allocated portions for respective active subscriber stations and respective unallocated portions that are adjacent to the respective allocated portions and are not allocated to one of the respective active subscriber stations. The respective allocated portions and the respective unallocated portions are configured in a selected pattern in the noise and interference measurement frame. Respective noise and interference levels (e.g., power levels) in the respective unallocated portions of the first noise and interference measurement frame are then determined at a serving base station. Respective signal levels (e.g., power levels) in the respective allocated portions of the first noise and interference measurement frame are also determined at the serving base station. One or more rogue subscriber stations, included in the respective active subscriber stations, are then identified based on the respective noise and interference levels and the respective signal levels for the respective active subscriber stations.

According to a different aspect of the present disclosure, a wireless communication device includes a transceiver and a circuit (e.g., a processor) coupled to the transceiver. The transceiver is configured to transmit a schedule for a first noise and interference measurement frame that includes respective allocated portions for respective active subscriber stations and respective unallocated portions that are adjacent to the respective allocated portions and are not allocated to one of the respective active subscriber stations. The respective allocated portions and the respective unallocated portions are configured in a selected pattern in the noise and interference measurement frame. The circuit is configured to determine the respective noise and interference levels (e.g., power levels) in the respective unallocated portions of the first noise and interference measurement frame and determine respective signal levels (e.g., power levels) in respective allocated portions of the first noise and interference measurement frame. The circuit is also configured to identify one or more rogue subscriber stations, included in the respective active subscriber stations, based on the respective noise and interference levels and the respective signal levels for the respective active subscriber stations.

With reference to FIG. 1, an example diagram of a relevant portion of an uplink (UL) subframe 100 of a wireless communication system is illustrated that depicts a subscriber station (SS) transmitting outside of allocated time-slots (slots). More specifically, the UL subframe 100 includes a ranging region 102 and five slots (labeled slots 0-4). The SS (labeled SS1) is assigned to transmit in slots 1-4. However, as is illustrated, SS1 is also transmitting in a portion (i.e., a last symbol) of slot 0 and outside of an assigned bandwidth. The transmission in slot 0 (by SS1) corresponds to NI that may adversely affect communication by an SS that is assigned to transmit in slot 0 for the subchannels that are assigned to SS1. Moreover, the transmission outside of the assigned bandwidth in slot 1 by SS1 may adversely affect communications by an SS that is assigned to transmit in slot 1 for the subchannels that are not assigned to SS1.

Figure 2:
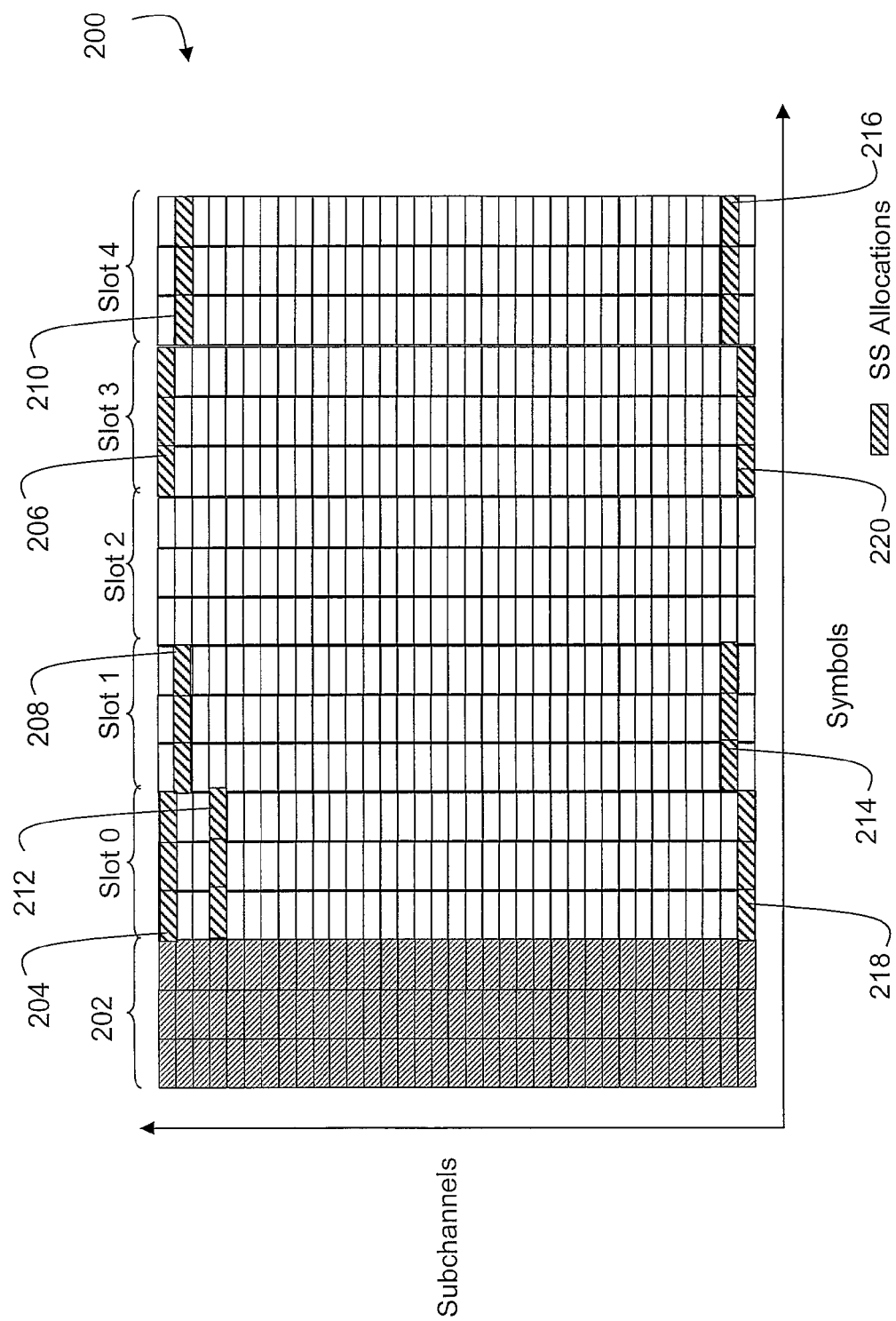
FIG. 2 is an example diagram of a relevant portion of a UL subframe of a wireless communication system that depicts active SSs assigned to slots of the UL subframe according to one embodiment of the present disclosure.

With reference to FIG. 2, an example diagram depicts a relevant portion of an uplink (UL) subframe 200 of a wireless communication system that depicts NI measurement frame allocations (according to a selected UL pattern) for active SSs associated with a BS. The NI measurement frame allocation facilitates determining which, if any, of the SSs may be rogue SSs (i.e., SSs that are transmitting outside of an assigned slot or slots). It should be noted that each of the SSs is allocated one slot (which in the case depicted includes three symbols) in a subchannel (which may include, for example, twenty-four subcarriers) and each of the allocated slots are separated by two unallocated slots. It should be appreciated that an SS may be allocated more than one slot and allocated slots may be separated by more than two unallocated slots. The UL subframe 200, as depicted, includes a ranging area 202 and five slots (labeled slots 0-4) and thirty-five subchannels. It should also be appreciated that techniques disclosed herein are applicable to UL subframes having more or less than five slots (with each slot having more or less than three symbols) and more or less than thirty-five subchannels. As is shown in the UL subframe 200 of FIG. 2, there are nine active SSs (i.e., SS1-SS9). More specifically, SS1 is allocated slot 204, SS2 is allocated slot 206, SS3 is allocated slot 208, SS4 is allocated slot 210, SS5 is allocated slot 212, SS6 is allocated slot 214, SS7 is allocated slot 216, SS8 is allocated slot 218, and SS9 is allocated slot 220.

Figure 3:
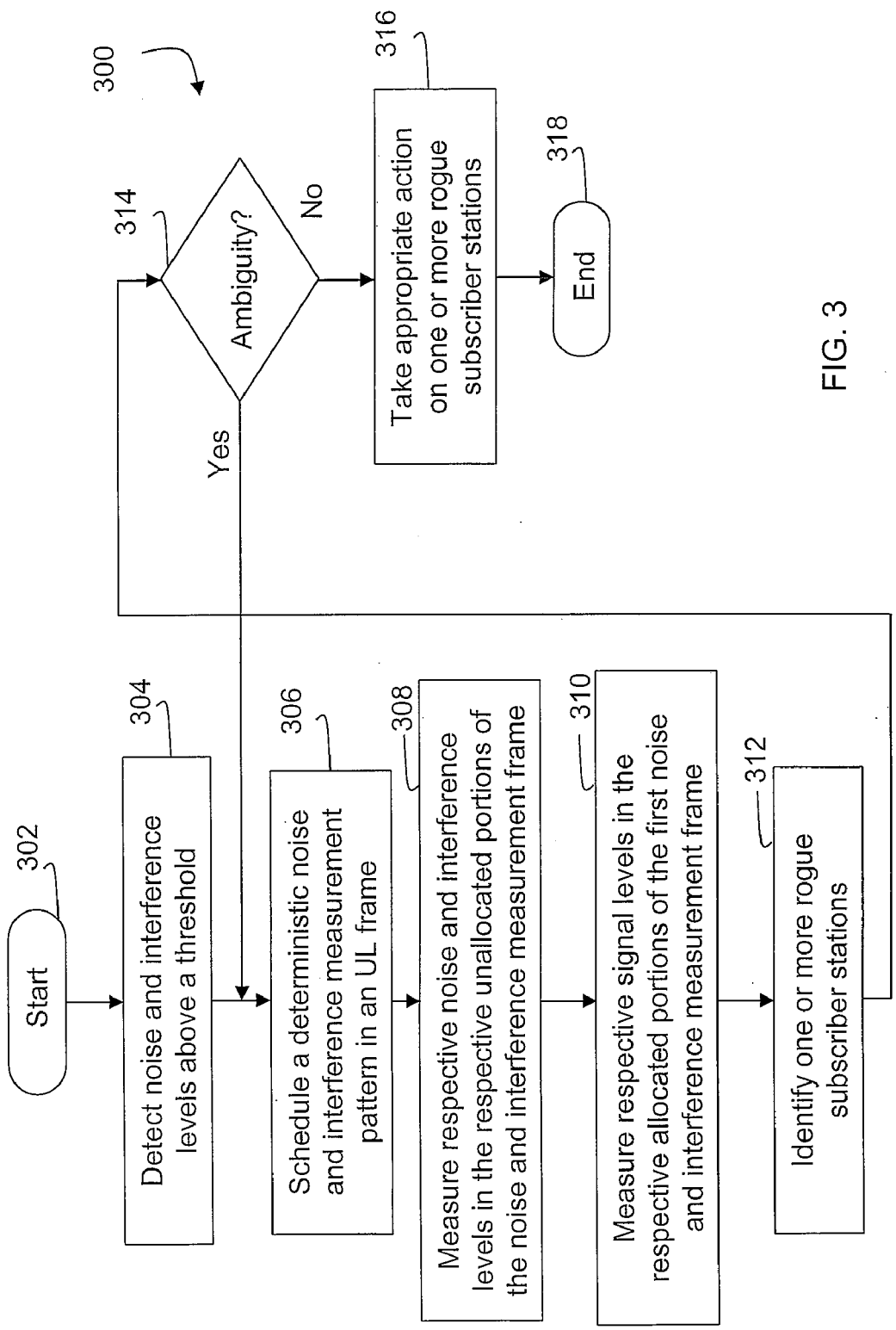
FIG. 3 is a flow chart of an example process for reducing noise and interference in a wireless communication system, according to one embodiment of the present disclosure.

Moving to FIG. 3, an example process 300 for decreasing noise and interference in an uplink of a wireless communication system is illustrated. The process 300 is initiated in block 302, at which point control transfers to block 304. In block 304, noise and interference levels (e.g., power levels) above a threshold (e.g., 10 dBm) are detected, at a serving base station (BS). For example, the serving BS may periodically measure NI in unallocated slots of a UL subframe to detect whether the NI is above the threshold. Then, in block 306, a first noise and interference measurement frame is scheduled that includes respective allocated portions for respective active subscriber stations and respective unallocated portions that are adjacent to the respective allocated portions and are not allocated to one of the respective active subscriber stations.

Next, in block 308, respective noise and interference levels (e.g., power levels) in the respective unallocated portions of the noise and interference measurement frame (e.g., that are adjacent to the allocated portions) are determined at the serving BS. Then, in block 310, respective signal levels (e.g., power levels) in the respective allocated portions of the noise and interference measurement frame are also determined at the serving base station to ensure that an SS is actually transmitting in an assigned slot or slots. Next, in block 312, one or more potential rogue subscriber stations (SSs), included in the respective active SSs, are then identified based on the respective noise and interference levels and the respective signal levels (assuming block 310 is implemented) for the respective active subscriber stations.

Then, in decision block 314, the process 300 determines if there is ambiguity as to which of the identified potential rogue SSs are, in fact, rogue SSs. If ambiguity exists as to which of the SSs is a rogue SS, control transfers from block 314 to block 306, where a new NI measurement frame is created in an attempt to remove ambiguity as to which of the identified potential rogue SSs is, in fact, a rogue SS. For example, when two SSs are allocated slots that are separated by two unallocated slots, it may be ambiguous as to whether one or both of the SSs is a rogue SS when a first one of the SSs (in time) transmits late and a second one of the SSs (in time) transmits early. When there is no ambiguity in block 314, control transfers from block 314 to block 316, where appropriate action is taken on the rogue SSs. For example, a blacklist of rogue SSs can be used to deregister SSs confirmed as rogue SSs. Defective SSs (indicated by the blacklist) may also be reported to an element management system (EMS) and/or MAC addresses associated with the rogue SSs may be used to filter ranging request (RNG-REQ) messages to prevent network entry (NE) completion for the rogue SSs. Following block 316, the process 300 terminates in block 318, where control returns to a calling routine.

Figure 4:
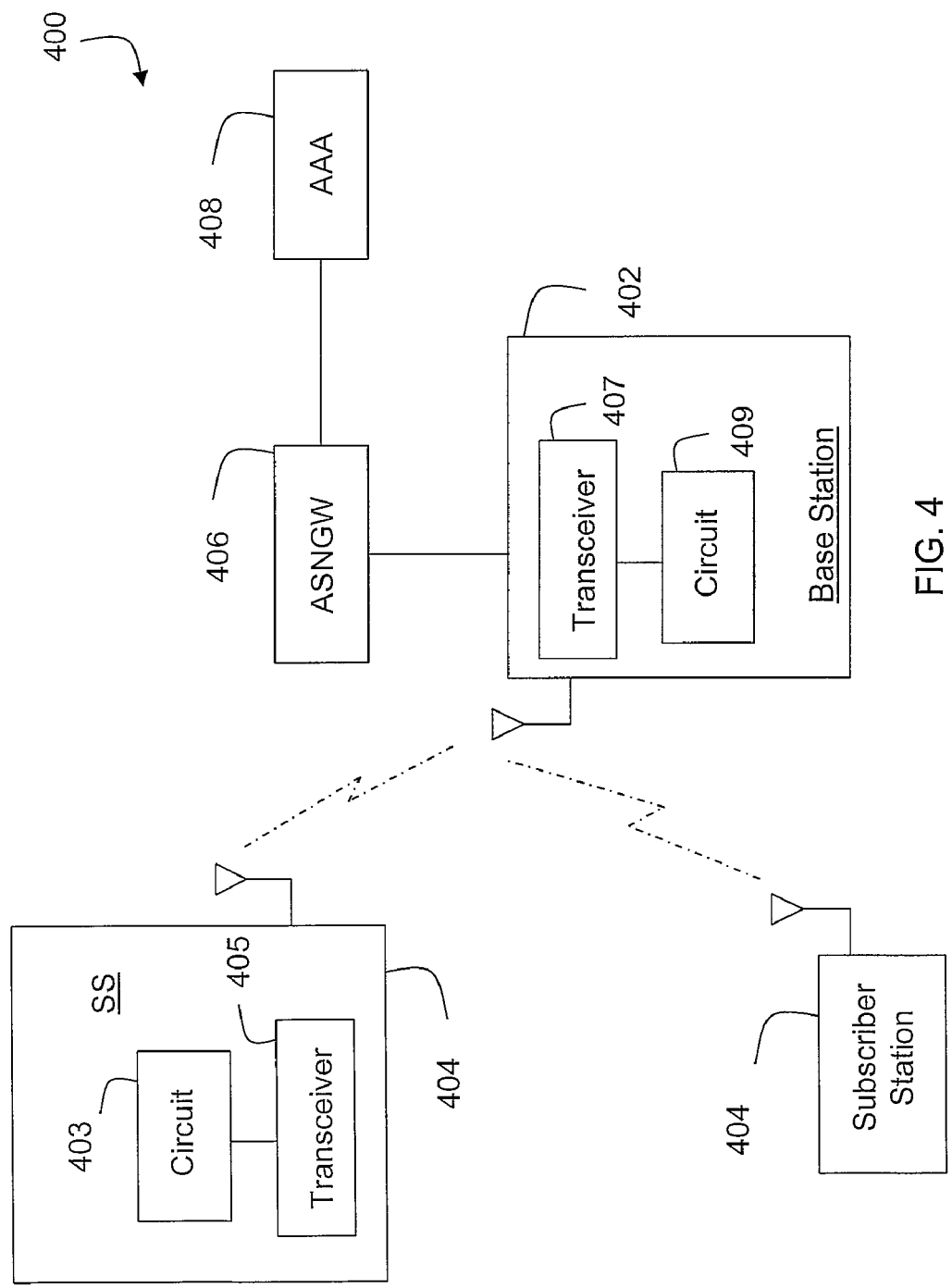
FIG. 4 is an electrical block diagram of an example wireless communication system that may be configured according to the present disclosure.

With reference to FIG. 4, an example wireless communication network 400 includes multiple subscriber stations (SSs) 404, e.g., mobile stations (MSs), that are configured to communicate with another device via a serving base station (BS). The SSs 404 may transmit/receive various information, e.g., voice, images, video, and audio, to/from various sources, e.g., another SS, or an internet-connected server. As is depicted, the BS 402 is coupled to an access service network gateway (ASNGW) 406, which is coupled to an authentication, authorization, and accounting (AAA) server 408. The BS 402 includes a transceiver (i.e., a transmitter and a receiver) 407, which is coupled to a circuit 409 (which may be, for example, a microprocessor, a microcontroller, a programmable logic device (PLD), or an application specific integrated circuit (ASIC)) that may be configured to execute a software system to perform the various techniques disclosed herein. Similarly, the SSs 404 includes a transceiver 405 coupled to a circuit 403 (which may be, for example, a microprocessor, a microcontroller, a PLD, or an ASIC) that is configured to execute the various techniques disclosed herein. The circuit 403 may also be coupled to a display (e.g., a liquid crystal display (LCD)) and an input device (e.g., a keypad). Accordingly, techniques have been disclosed herein the substantially reduce noise and interference in a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment is typically stored in one or more machine readable storage mediums, such as fixed (hard) drives, diskettes, optical disks, magnetic tape, semiconductor memories (e.g., read-only memories (ROMs), programmable ROMs (PROMs), etc.), thereby making an article of manufacture in accordance with the invention. The article of manufacture containing the computer programming code is used by either executing the code directly from the storage device, by copying the code from the storage device into another storage device, such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method of decreasing noise and interference in an uplink of a wireless communication system, comprising:
  detecting, at a serving base station, noise and interference levels above a threshold in unallocated portions for active subscriber stations, wherein the unallocated portions comprise the portions that are not assigned to any active subscriber station;
  scheduling, in response to the detecting, a noise and interference measurement frame that includes respective allocated portions for respective active subscriber stations and respective unallocated portions that are adjacent to the respective allocated portions, wherein the respective allocated portions and the respective unallocated portions are configured in a selected pattern;
  determining based on the scheduled frame, at the serving base station, respective signal levels in allocated por- tions and respective noise and interference levels in the respective unallocated portions of the noise and interference measurement frame;

identifying one or more rogue subscriber stations, included in the respective active subscriber stations, based on the respective noise and interference levels associated with the respective active subscriber stations; and isolating the identified one or more rogue subscriber stations from other active subscriber stations.

2. The method of claim 1, wherein the respective active subscriber stations are each allocated respective single transmission time-slots in the noise and interference measurement frame, and wherein none of the respective single transmission time-slots are adjacent.

3. The method of claim 2, wherein the respective single transmission time-slots are separated in time by at least two unallocated time-slots in the noise and interference measurement frame.

4. The method of claim 1, further comprising:
placing the one or more rogue subscriber stations in a rogue device list; and
deregistering, with the serving base station, the one or more rogue subscriber stations.

5. The method of claim 4, further comprising:
adding respective medium access control addresses for the one or more rogue subscriber stations to a blacklist; and
filtering, at the serving base station, initial ranging requests from the one or more rogue subscriber stations on the blacklist.

6. The method of claim 4, further comprising:
reporting the one or more rogue subscriber stations in the rogue device list to an element management system.

7. The method of claim 1, wherein the detecting, at a serving base station, noise and interference levels above a threshold further comprises:
periodically determining noise and interference levels in unallocated portions of an uplink subframe; and
comparing the determined noise and interference levels to the threshold.

8. The method of claim 1, further comprising:
determining, at the serving base station, respective signal levels in the respective allocated portions of the noise and interference measurement frame; and
identifying the one or more rogue subscriber stations, included in the respective active subscriber stations, based on the respective noise and interference levels and the respective signal levels for the respective active subscriber stations.

9. A method of decreasing noise and interference in an uplink of a wireless communication system, comprising:
detecting, at a serving base station, noise and interference levels above a threshold in unallocated portions for active subscriber stations, wherein the unallocated portions comprise the portions that are not assigned to any active subscriber station;
scheduling, in response to the detecting, a first noise and interference measurement frame that includes respective allocated portions for respective active subscriber stations and respective unallocated portions that are adjacent to the respective allocated portions, wherein the respective allocated portions and the respective unallocated portions are configured in a selected pattern;
determining based on the scheduled frame, at the serving base station, respective noise and interference levels in the respective unallocated portions of the first noise and interference measurement frame;
determining based on the scheduled frame, at the serving base station, respective signal levels in the respective allocated portions of the first noise and interference measurement frame;
identifying one or more rogue subscriber stations, included in the respective active subscriber stations, based on the respective noise and interference levels and the respective signal levels for the respective active subscriber stations and
isolating the identified one or more rogue subscriber stations from other active subscriber stations.

10. The method of claim 9, wherein the respective active subscriber stations are each allocated respective single transmission time-slots in the first noise and interference measurement frame, and wherein none of the respective single transmission time-slots are adjacent.

11. The method of claim 10, wherein the respective single transmission time-slots are separated in time by at least two unallocated time-slots in the first noise and interference measurement frame.

12. The method of claim 9, further comprising:
placing the one or more rogue subscriber stations in a rogue device list; and
deregistering, with the serving base station, the one or more rogue subscriber stations.

13. The method of claim 12, further comprising:
adding respective medium access control addresses for the one or more rogue subscriber stations to a blacklist; and
filtering, at the serving base station, initial ranging requests from the one or more rogue subscriber stations on the blacklist.

14. The method of claim 13, further comprising:
reporting the one or more rogue subscriber stations in the rogue device list to an element management system.

15. The method of claim 9, further comprising
periodically determining noise and interference levels in unallocated portions of an uplink subframe; and
comparing the determined noise and interference levels in the unallocated portions of the uplink subframe to a threshold to determine whether to schedule the first noise and interference measurement frame.

16. The method of claim 9, further comprising:
scheduling, when the determined respective noise and interference levels and the determined signal levels associated with the first noise and interference measurement frame are ambiguous as to whether two or more of the respective active subscriber stations should be included in the one or more rogue subscriber stations, a second noise and interference measurement frame that includes respective allocated portions for the two or more of the respective active subscriber stations and respective unallocated portions that are adjacent to the respective allocated portions and are not allocated to one of the two or more of the respective active subscriber stations.

17. A wireless communication device, comprising:
a scheduler configured to:
detect noise and interference levels above a threshold in unallocated portions for active subscriber stations, wherein the unallocated portions comprise the portions that are not assigned to any active subscriber station;
a transceiver configured to:
transmit, in response to the detection, a schedule for a first noise and interference measurement frame that includes respective allocated portions for respective active subscriber stations and respective unallocated portions that are adjacent to the respective allocated portions and are not allocated to one of the respective active subscriber stations, wherein the respective allocated portions and the respective unallocated portions are configured in a selected pattern;

a circuit coupled to the transceiver, wherein the circuit is configured to:

measure, based on the scheduled frame, the respective noise and interference levels in the respective unallocated portions of the first noise and interference measurement frame;

measure, based on the scheduled frame, respective signal levels in respective allocated portions of the first noise and interference measurement frame;

identify one or more rogue subscriber stations, included in the respective active subscriber stations, or determine that none of the respective active subscriber stations are rogue subscriber stations based on the respective noise and interference levels and the respective signal levels for the respective active subscriber stations; and isolate the identified one or more rogue subscriber stations from other active subscriber stations.

18. The wireless communication device of claim 17, wherein the respective active subscriber stations are each allocated respective single transmission time-slots in the first noise and interference measurement frame, and wherein the respective single transmission time-slots are separated in time by at least two unallocated time-slots in the first noise and interference measurement frame.

19. The wireless communication device of claim 17, wherein the circuit is further configured to:

periodically measure noise and interference levels in an unallocated portion of an uplink subframe; and compare the determined noise and interference levels in the unallocated portion of the uplink subframe to a threshold to determine whether to schedule the first noise and interference measurement frame.

20. The wireless communication device of claim 17, wherein the circuit is further configured to:

schedule, when the determined respective noise and interference levels and the determined signal levels associated with the first noise and interference measurement frame are ambiguous as to whether two or more of the respective active subscriber stations should be included in the one or more rogue subscriber stations, a second noise and interference measurement frame that includes respective allocated portions for the two or more of the respective active subscriber stations and respective unallocated portions that are adjacent to the respective allocated portions and are not allocated to one of the two or more of the respective active subscriber stations.

* * * * *